(12) United States Patent
Hsu et al.

(10) Patent No.: US 7,499,133 B2
(45) Date of Patent: Mar. 3, 2009

(54) MULTI-DOMAIN VERTICAL ALIGNMENT LIQUID CRYSTAL DISPLAY DEVICE

(75) Inventors: Che-Ming Hsu, Tainan (TW); I-Lin Ho, Tainan (TW); Ming-Feng Hsieh, Tainan (TW); Tzu-Yuan Kuo, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 423 days.

(21) Appl. No.: 11/456,365

(22) Filed: Jul. 10, 2006

(65) Prior Publication Data
US 2007/0013848 A1 Jan. 18, 2007

(30) Foreign Application Priority Data
Jul. 11, 2005 (TW) .............................. 94123413 A

(51) Int. Cl.
G02F 1/1337 (2006.01)
G02F 1/1343 (2006.01)

(52) U.S. Cl. ..................................... 349/129; 349/139

(58) Field of Classification Search ................. 349/129, 349/38, 39, 42, 46, 82, 83, 139, 141, 142, 349/143, 144, 158
See application file for complete search history.

(56) References Cited

U.S. PATENT DOCUMENTS

| 6,671,020 B2 * | 12/2003 | Kim et al. .................... 349/129 |
| 2005/0190313 A1 * | 9/2005 | Wang .......................... 349/38 |
| 2005/0231672 A1 * | 10/2005 | Liu et al. ..................... 349/139 |
| 2007/0013848 A1 * | 1/2007 | Hsu et al. .................... 349/129 |

* cited by examiner

*Primary Examiner*—Brian M Healy

(57) ABSTRACT

A multi-domain vertical alignment liquid crystal display device is disclosed. The multi-domain vertical alignment liquid crystal display device includes an upper substrate and a lower substrate parallel to each other, a liquid crystal layer between the upper substrate and the lower substrate, a common electrode disposed between the liquid crystal layer and the upper substrate, and a pixel electrode disposed between the liquid crystal layer and the lower substrate. Preferably, the common electrode includes an upper jagged pattern and the pixel electrode includes a lower jagged pattern.

19 Claims, 3 Drawing Sheets

MULTI-DOMAIN VERTICAL ALIGNMENT LIQUID CRYSTAL DISPLAY DEVICE

RELATED APPLICATIONS

The present application is based on, and claims priority from, TW Application Number 94123413, filed Jul. 11, 2005, the disclosure of which is hereby incorporated by reference herein in its entirety

BACKGROUND OF THE INVENTION

1. Field of the Invention

The invention relates to a multi-domain vertical alignment liquid crystal display panel, and more particularly, to a multi-domain vertical alignment liquid crystal display panel having common electrode and pixel electrode with jagged patterns.

2. Description of the Prior Art

Liquid crystal displays are commonly utilized in various electronic products including cell phones, PDAs, and notebook computers. As the market demand for large-scale display panels continues to increase, liquid crystal displays having advantages such as small size and light weight have become widely popular. In fact, LCDs are gradually replacing the conventional cathode ray tube (CRT) displays that had dominated the market for so many years. However, the viewing angle of the conventional liquid crystal displays is not sufficiently wide to ensure a high display quality, therefore, the development of liquid crystal displays is limited by this important factor. A multi-domain vertical alignment (MVA) display capable of orientating liquid crystals in various directions is therefore made to improve the problem of the previously described insufficient viewing angle of the conventional displays.

FIG. 1 is a perspective diagram illustrating a liquid crystal display panel according to the prior art. As shown in FIG. 1, the liquid crystal display panel 100 is a multi-domain vertical alignment liquid crystal display panel, in which the liquid crystal display panel 100 includes an upper substrate 102, a color filter layer 104, a common electrode 106, a plurality of liquid crystals 108, a pixel electrode 110, and a lower substrate 114. The common electrode 106 includes a plurality of protrusions 116 disposed thereon, and the pixel electrode 110 of each pixel includes a slit 118 positioned relatively between the protrusions 116. Due to a fringe field effect caused by the protrusions 116 and the slit 118, the liquid crystals 108 are able to align in different directions, specifically, thereby increasing the viewing angle of the liquid crystal display panel 100.

However, it is known that as the distance between the protrusions 116 and the slit 118 increases, the liquid crystals between the protrusions 116 and the slit 118 require more time for aligning as the adjacent liquid crystals tilt. The result increases the response time of the liquid crystals, and also results in a disclination phenomenon. Typically, the disclination phenomenon is caused by the weak fringe field effect exerted on the liquid crystals between the protrusions 116 and the slit 118, and the influence of the vertical electric field on the liquid crystals. Often this results in an uncontrollable alignment of the liquid crystals.

Another factor contributing to the disclination phenomenon involves an abrupt increase of high voltage. Preferably, the alignment of the liquid crystals between the protrusions 116 and the slit 118 are affected by the vertical electric field before being influenced by the tilting of the adjacent liquid crystals, in which the liquid crystals between the protrusions 116 and the slit 118 will tilt toward any direction as a result of the impact caused by the vertical electric field. Since the tilting direction of the liquid crystals is not controlled by the fringe field effect, the disclination phenomenon will result. Ultimately this produces gray spots or black spots, which can be observed under an optical microscope.

Essentially, liquid crystals tilting toward any direction that do not align according to a 45 degree angle with respect to an upper and lower polarizer of the display cause the gray spots and black spots. For example, this can happen when the adjacent liquid crystals induce the liquid crystals suffering from disclination to re-tilt back to a proper 45 degree angle with respect to the upper and lower polarizer. A significantly longer time is required to accomplish the needed correction and eventually this results in an increase in the response time. Moreover, when the adjacent liquid crystals fail to induce such said change on the liquid crystals suffering from disclination, the gray spots or the black spots will appear on the liquid crystals and the brightness of the liquid crystals will be significantly affected.

It is known that the driving of the multi-domain vertical alignment liquid crystal display involves a threshold voltage, such that when an external driving voltage applied on the display exceeds the threshold voltage, the disclination phenomenon described previously will take place. Hence, the conventional MVA displays must ensure that the driving voltage is maintained well below the threshold voltage, thereby reducing the overall response time of the display. Additionally, the gap between the protrusions and the slit must also be maintained under a certain distance to prevent the disclination phenomenon. By reducing the gap between the protrusions and the slit, the threshold voltage can be increased and the range of driving voltage being utilized can be further increased. However, as the gap between the protrusions and slit is reduced, the number of protrusions and slits within a pixel will also increase. Additionally, because the protrusions and slits are essentially non-display regions, the aperture ratio of the pixel region of the display will decrease and ultimately reduce the brightness of the liquid crystal display.

FIG. 2 is a perspective diagram illustrating another liquid crystal display panel according to the prior art. As shown in FIG. 2, the liquid crystal display panel 100 includes an upper substrate 202, a color filter layer 204, a common electrode 206, a plurality of liquid crystals 208, a pixel electrode 210, and a lower substrate 214. The common electrode 206 includes a plurality of protrusions 216. In contrast to the panel 100 described in FIG. 1, the pixel electrode 210 of the liquid crystal display panel 200 includes a plurality of jagged patterns 218 in the slit region and between the protrusions 216. The jagged patterns 218 allow the liquid crystals 218 to align in a specific manner and toward different directions, and also increase the fringe field of the slits and the protrusions. As a result, said jagged patterns 218 thereby improve the response time of the liquid crystals. Despite the fact that the gap between the protrusions and the slits can be increased, problems such as disclination of the liquid crystals continue to occur. Hence, the gap between the protrusions and the slits must be maintained below a certain value, thereby limiting the aperture ratio of the pixel region.

As mentioned previously, despite the fact that both of the liquid crystal panel 100 and 200 exhibit a wide viewing angle characteristic, the response time of the liquid crystals is still not fast enough, thereby resulting in problems, for example, such as shadowing. Additionally, disadvantages such as low aperture ratio and insufficient transmittance of the light of the display panels also significantly influence the performance of the liquid crystal display.

SUMMARY OF THE INVENTION

The embodiments of the present invention are directed to providing a multi-domain vertical alignment liquid crystal display panel to obviate the aforementioned problems.

One embodiment of the present invention is directed to a multi-domain vertical alignment liquid crystal display device. This multi-domain vertical alignment liquid crystal display device includes an upper substrate and a lower substrate parallel to each other, a liquid crystal layer between the upper substrate and the lower substrate, a common electrode disposed between the liquid crystal layer and the upper substrate, and a pixel electrode disposed between the liquid crystal layer and the lower substrate. Preferably, the common electrode includes an upper jagged pattern and the pixel electrode includes a lower jagged pattern.

Another embodiment of the present invention is directed to a liquid crystal display device. This liquid crystal display device includes a first substrate and a second substrate; a liquid crystal layer disposed between the first substrate and the second substrate, in which the liquid crystal layer includes a plurality of liquid crystals positioned vertically to a main surface of the first substrate while no electric field is being applied; a common electrode disposed on the first substrate, in which the common electrode comprises at least one first jagged pattern; and at least one pixel electrode, disposed on the second substrate, in which the pixel electrode includes at least one second jagged pattern. Preferably, the first jagged pattern includes a first main slit and a plurality of first fine slits located on both sides of the first main slit, and the second jagged pattern includes a second main slit and a plurality of second fine slits located on both sides of the second main slit, in which the first jagged pattern and the second jagged pattern are arranged in parallel to each other and disposed in an alternating fashion with respect to the first substrate and the second substrate (e.g., the alternating fashion is clearly visible when the first substrate and the second substrate are overlaid).

According to a further embodiment of the present invention, a liquid crystal display device includes a first substrate and a second substrate, a liquid crystal layer disposed between the first substrate and the second substrate, a common electrode disposed on the first substrate, a pixel electrode having jagged patterns disposed on the second substrate, and a storage capacitor disposed on the second substrate. Preferably, the surface of the first substrate corresponding to the storage capacitor does not include the common electrode.

The embodiments of the present invention not only improve the viewing angle of the liquid display panel, but also reduce the response time of the liquid crystals thus significantly improving the dynamic image quality. Additionally, the embodiments of the present invention increase the light transmittance efficiency of the display panel, thereby achieving a higher level of brightness and contrast, hence improving the performance of the display panel.

BRIEF DESCRIPTION OF THE DRAWINGS

The various aspect and advantages of the present invention will become more apparent given the following detailed description of the embodiments taken with the appended figures wherein.

DETAILED DESCRIPTION OF THE EXEMPLARY EMBODIMENTS

Certain terminology is used throughout the following description and claims to refer to particular system components. As one skilled in the art will appreciate, consumer electronic equipment manufacturers may refer to a component by different names. This document does not intend to distinguish between components that differ in name but in terms of function. For example, in the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
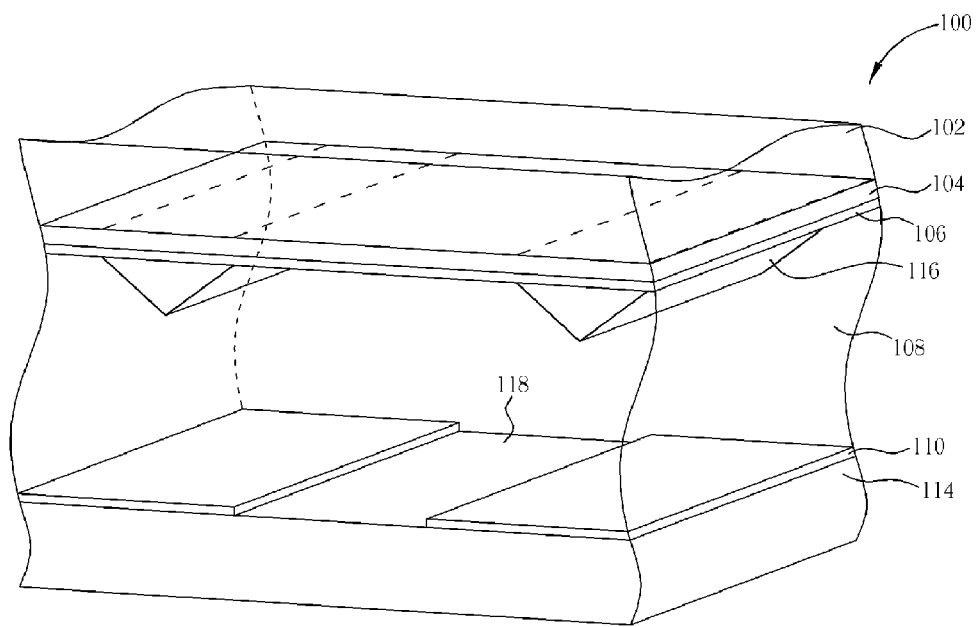
FIG. 1 is a perspective diagram illustrating a liquid crystal display panel according to the prior art.
Figure 2:
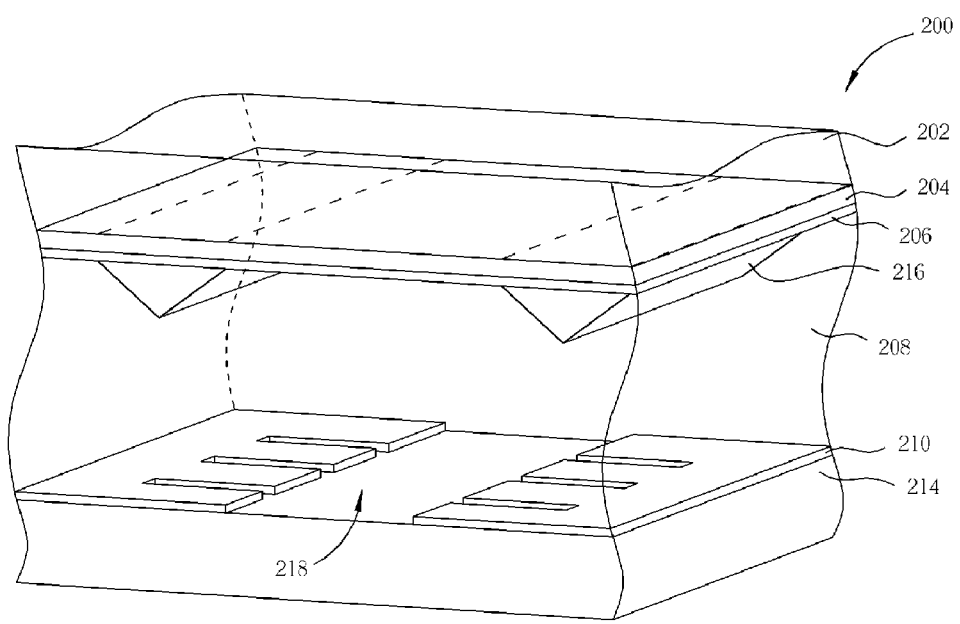
FIG. 2 is a perspective diagram illustrating another liquid crystal display panel according to the prior art.
Figure 3:
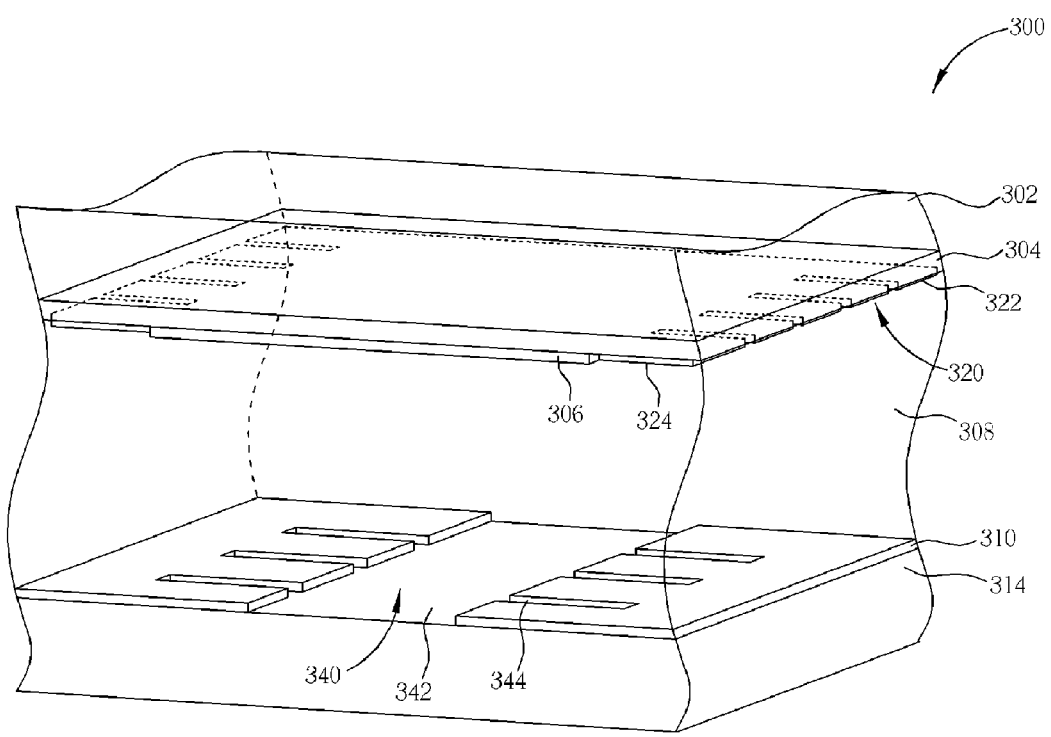
FIG. 3 is a perspective diagram illustrating the structure of a multi-domain vertical alignment liquid crystal display panel according to the present invention.

FIG. 3 is a perspective diagram illustrating the structure of a multi-domain vertical alignment liquid crystal display panel according to the present invention. As shown in FIG. 3, the multi-domain vertical alignment liquid crystal display panel 300 is formed by stacking an upper substrate 302, a color filter layer 304, a common electrode 306, a plurality of liquid crystals 308, a pixel electrode 310, and lower substrate 314 parallel to the upper substrate 302. The common electrode 306 includes a plurality of upper jagged patterns 320, in which each of the upper jagged patterns 320 is composed of a main slit 322 and a plurality of fine slits 324 located on both sides of the main slit 322. The pixel electrode 310 on the other hand, includes a plurality of lower jagged patterns 340 corresponding to the upper jagged patterns 320, in which each of the lower jagged patterns 340 is composed of a main slit 342 and a plurality of fine slits 344 located on both sides of the main slit 342.

It should be noted that the upper jagged patterns 320 and the lower jagged patterns 340 are disposed alternately in each pixel of the multi-domain vertical alignment liquid crystal display panel 300 and in a manner parallel to the upper substrate 302 and the lower substrate 314. Due to the influence of the upper jagged patterns 320 and the lower jagged patterns 340, the liquid crystals 308 disposed between the upper substrate 302 and the lower substrate 314 will generate a fixed and tilted angle. Since the fine slits 324 and 344 increase the fringe effect of the liquid crystals away from the main slits 322 and 342, the tilting direction of the liquid crystals when a voltage is applied can be controlled much more effectively, the disclination phenomenon can be improved, and the response time of the liquid crystals can be improved significantly. Since the fine slits 324 and 344 increase the fringe effect, the main slits 322 and 342 are now able to obtain an even larger gap to reduce the distribution density of the main slits and increase the aperture ratio, thereby improving the performance of the liquid crystal display.

According to an embodiment of the present invention, the upper jagged patterns 320 and the lower jagged patterns 340 shown in FIG. 3 that are composed of jagged slits, can also be replaced with jagged protrusions. Alternatively, the common electrode 306 can be formed with jagged protrusions and the pixel electrode 310 can be formed with jagged pattern slits, or the common electrode 306 can be formed with jagged pattern slits and the pixel electrode 310 can be formed with jagged protrusions. Preferably, the common electrode 306 is composed of transparent conductive materials such as indium tin oxide (ITO) or indium zinc oxide (IZO). If the pixel electrode 310 were also composed of a transparent electrode such as ITO or IZO, the multi-domain vertical alignment liquid crystal display panel 300 would be a transmissive liquid crystal display panel. However, if the pixel electrode 310 were composed of a metal electrode, the multi-domain vertical alignment liquid crystal display panel 300 would be a reflective liquid crystal display panel. Moreover, if the pixel electrode 310 included both metal electrode and transparent electrode, the multi-domain vertical alignment liquid crystal display panel 300 would be a transflective liquid crystal display panel.

Figure 4:
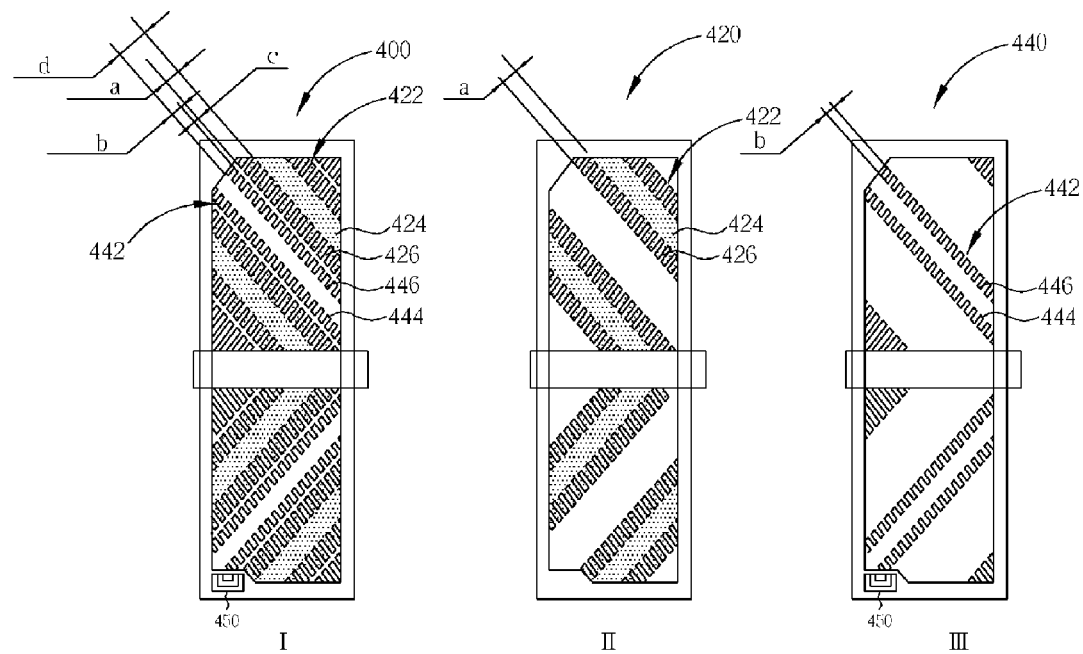
FIG. 4 is a perspective diagram illustrating a top view of upper jagged patterns and lower jagged patterns of a multi-domain vertical alignment liquid crystal display panel according to the present invention.

FIG. 4 is a perspective diagram illustrating a top view of upper jagged patterns and lower jagged patterns of a multi-domain vertical alignment liquid crystal display panel according to the present invention. As shown in FIG. 4, diagram II illustrates a pixel structure with respect to an upper substrate, diagram III illustrates a pixel structure with respect to a lower substrate, and diagram I illustrates a top view of the upper jagged patterns and lower jagged patterns of the overlapping pixels from diagrams II and III. As shown in FIG. 4, a common electrode 420 from the pixel structure of diagram II includes a plurality of upper jagged patterns 422, in which each of the upper jagged patterns 422 is composed of a main slit 424 and a plurality of fine slits 426 positioned on both sides of the main slit 424. Each fine slit 426 includes a length a. A pixel electrode 440 of the pixel structure from diagram III includes a plurality of lower jagged patterns 442, in which each of the lower jagged patterns 442 is composed of a main slit 444 and a plurality of fine slits 446 located on both sides of the main slit 444. Each of the fine slits 446 includes a length b. A thin film transistor 450 is disposed on the lower substrate (not shown).

When the common electrode 420 overlaps the pixel electrode 440 on a multi-domain vertical alignment liquid crystal display panel 400, the upper jagged patterns 422 and the lower jagged patterns 442 will be alternately disposed, in which a distance between the upper jagged patterns 422 and the lower jagged patterns 442 is represented by a fine slit gap c. Additionally, as shown in diagram I, a smallest distance between the main slit 424 of the upper jagged patterns 420 and the main slit 444 of lower jagged patterns 426 is represented by a main slit gap d, in which the main slit gap d is the sum of the length a of the fine slit 426, the length b of the fine slit 446, and the length of the fine slit gap c.

According to an embodiment of the present invention, the length of the fine slit gap c ban be zero, hence the main slit gap d will be equal to the sum of the length a and the length b. The length of the fine slit gap c can also be a negative number, which refers to a situation that two fine slits overlap each other. In this case, the length of the main slit gap d will be equal to the sum of the length a and the length b and minus the length of the fine slit gap c. Preferably, the values of a, b, and c can be adjusted according to the design of the display. For instance, when a user wishes to obtain an adequate response time and maximum transmittance of light, c can be set to a positive number or zero, in which the preferred values for the three variables are $a \leqq 30 \mu m$, $b \leqq 30 \mu m$, and $0 \mu m \leqq c \leqq 20 \mu m$. Alternatively, when the user wishes to obtain a faster response time, c can be set to a negative number, as the two slits overlap each other, and the preferred values for the three variables in this case are $a \leqq 40 \mu m$, $b \leqq 40 \mu m$, and $-20 \mu m \leqq c \leqq 0 \mu m$. Preferably, the absolute value of the variable c can be half of the value of the variable a or the variable b. It should also be noted that neither of the main slits are overlapping any of the fine slits located on the electrode of the opposite substrate.

Figure 5:
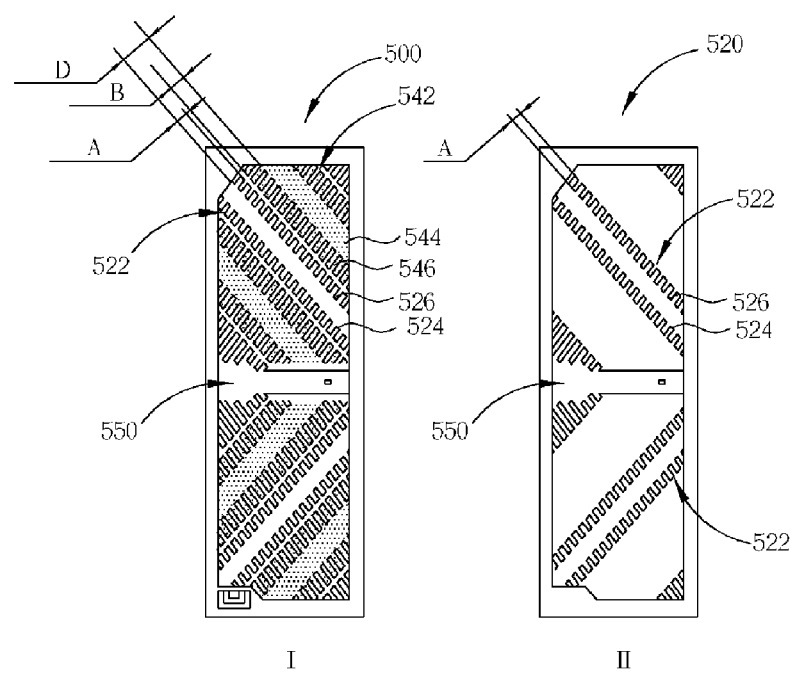
FIG. 5 is a perspective diagram illustrating a top view of upper jagged patterns and lower jagged patterns of a multi-domain vertical alignment liquid crystal display panel when the fine slit gap equals zero according to an embodiment of the present invention.

FIG. 5 is a perspective diagram illustrating a top view of upper jagged patterns and lower jagged patterns of a multi-domain vertical alignment liquid crystal display panel when the fine slit gap is equal to zero according to an embodiment of the present invention. As shown in FIG. 5, diagram I illustrates an overlapping view of the upper jagged patterns 522 and the lower jagged patterns 542, and diagram II illustrates a common electrode 520 of an upper substrate having a plurality of upper jagged patterns 522. It should be noted that in this embodiment, the common electrode that overlaps the storage capacitor region 550 is removed, such that no common electrode is present in the corresponding upper area of the storage capacitor region 550. Since the storage capacitor region 550 in the lower substrate allows no passage of light, liquid crystals within this region are unable to provide any display function. Hence, by removing the common electrode corresponding to the storage capacitor region, the image quality of the display will not be influenced. Additionally, removing the common electrode within this region not only decreases the liquid crystal capacitance of each pixel, but also reduces the time for charging the capacitor for each pixel. In other words, if the charging time is maintained as a constant, the present invention is able to reduce the thickness of the signal lines and increase the size of the pixel electrode, thereby achieving a much higher aperture ratio, increasing the light transmittance, and achieving a better display quality.

In contrast to the conventional technique, the present invention not only improves the viewing angle of the liquid display panel, but also shortens the response time of the liquid crystals for improving the dynamic image quality significantly. Additionally, the present invention increases the light transmittance efficiency of the display panel, thereby achieving a higher level of brightness and contrast, and improving the performance of the display panel.

Those skilled in the art will, given the preceding disclosure, readily understand that numerous modifications and alterations of the device and method may be made without departing from the teachings of the invention. Accordingly, the above disclosure should be construed as limited only by the metes and bounds of the appended claims.

What is claimed is:

1. A multi-domain vertical alignment liquid crystal display device, comprising:
   an upper substrate and a lower substrate parallel to the upper substrate;
   a liquid crystal layer, disposed between the upper substrate and the lower substrate;

a common electrode, disposed between the upper substrate and the liquid crystal layer, wherein the common electrode comprises at least one upper jagged pattern; and at least one pixel electrode, disposed between the liquid crystal layer and the lower substrate, wherein the pixel electrode comprises at least one lower jagged pattern;

wherein each of the upper jagged pattern and the lower jagged pattern comprises a main slit and a plurality of fine slits positioned on both sides of the main slit, and the horizontal distance between the fine slits of the upper jagged pattern and the fine slits of the lower jagged pattern comprises a fine slit gap, wherein the fine slit gap is between 0 μm to 20 μm, and the length of each of the fine slits is less than or equal to 30 μm.

2. The multi-domain vertical alignment liquid crystal display device of claim 1, further comprising at least one opening located on the common electrode and a storage capacitor disposed on the lower substrate, wherein the storage capacitor partially overlaps the opening.

3. The multi-domain vertical alignment liquid crystal display device of claim 1, wherein the upper jagged pattern and the lower jagged pattern comprise a plurality of protrusions disposed on the common electrode and the pixel electrode.

4. The multi-domain vertical alignment liquid crystal display device of claim 1, wherein the upper jagged pattern comprises a plurality of protrusions disposed on the common electrode, and the lower jagged pattern comprises the main slit and the fine slits of the pixel electrode.

5. The multi-domain vertical alignment liquid crystal display device of claim 1, wherein the upper jagged pattern comprises the main slit and the fine slits of the common electrode and the lower jagged pattern comprises a plurality of protrusions disposed on the pixel electrode.

6. A multi-domain vertical alignment liquid crystal display device, comprising:
an upper substrate and a lower substrate parallel to the upper substrate;
a liquid crystal layer, disposed between the upper substrate and the lower substrate;
a common electrode, disposed between the upper substrate and the liquid crystal layer, wherein the common electrode comprises at least one upper jagged pattern; and
at least one pixel electrode, disposed between the liquid crystal layer and the lower substrate, wherein the pixel electrode comprises at least one lower jagged pattern;
wherein each of the upper jagged pattern and the lower jagged pattern comprises a main slit and a plurality of fine slits positioned on both sides of the main slit, and each fine slit of the upper jagged pattern overlaps each fine slit of the lower jagged pattern, wherein the horizontal overlapping distance is between 0 μm to 20 μm, and the length of each of the fine slits is less than or equal to 40 μm.

7. The multi-domain vertical alignment liquid crystal display device of claim 6, wherein the horizontal overlapping distance is half the length of the fine slits.

8. The multi-domain vertical alignment liquid crystal display device of claim 6, wherein the main slit and the fine slits do not overlap each other in the horizontal direction.

9. The multi-domain vertical alignment liquid crystal display device of claim 6 further comprising at least one opening located on the common electrode and a storage capacitor disposed on the lower substrate, wherein the storage capacitor partially overlaps the opening.

10. The multi-domain vertical alignment liquid crystal display device of claim 6, wherein the upper jagged pattern and the lower jagged pattern comprise a plurality of protrusions disposed on the common electrode and the pixel electrode.

11. The multi-domain vertical alignment liquid crystal display device of claim 6, wherein the upper jagged pattern comprises a plurality of protrusions disposed on the common electrode, and the lower jagged pattern comprises the main slit and the fine slits of the pixel electrode.

12. The multi-domain vertical alignment liquid crystal display device of claim 6, wherein the upper jagged pattern comprises the main slit and the fine slits of the common electrode and the lower jagged pattern comprises a plurality of protrusions disposed on the pixel electrode.

13. A liquid crystal display device, comprising:
a first substrate and a second substrate;
a liquid crystal layer, disposed between the first substrate and the second substrate, the liquid crystal layer comprising a plurality of liquid crystals positioned vertically to a main surface of the first substrate while no electric field is being applied;
a common electrode, disposed on the first substrate, wherein the common electrode comprises at least one first jagged pattern; and
at least one pixel electrode, disposed on the second substrate, the pixel electrode comprising at least one second jagged pattern, wherein the first jagged pattern comprises a first main slit and a plurality of first fine slits positioned on both sides of the first main slit, the second jagged pattern comprises a second main slit and a plurality of second fine slits positioned on both sides of the second main slit, the first jagged pattern and the second jagged pattern are arranged in parallel to each other and are disposed in an alternating fashion with respect to each other, and the horizontal distance between the first fine slits and the second fine slits comprises a fine slit gap, wherein the fine slit gap is between 0 μm to 20 μm, and the length of each of the first fine slits and the second fine slits is less than or equal to 30 μm.

14. The liquid crystal display device of claim 13, wherein the first main slit and the second fine slits do not overlap each other in the horizontal direction, and the second main slit and the first fine slits do not overlap each other in the horizontal direction.

15. The liquid crystal display device of claim 13 further comprising at least one opening located on the common electrode and a storage capacitor disposed on the second substrate, wherein the storage capacitor partially overlaps the opening.

16. A liquid crystal display device, comprising:
a first substrate and a second substrate;
a liquid crystal layer, disposed between the first substrate and the second substrate, the liquid crystal layer comprising a plurality of liquid crystals positioned vertically to a main surface of the first substrate while no electric field is being applied;
a common electrode, disposed on the first substrate, wherein the common electrode comprises at least one first jagged pattern; and
at least one pixel electrode, disposed on the second substrate, the pixel electrode comprising at least one second jagged pattern, wherein the first jagged pattern comprises a first main slit and a plurality of first fine slits positioned on both sides of the first main slit, the second jagged pattern comprises a second main slit and a plurality of second fine slits positioned on both sides of the second main slit, the first jagged pattern and the second jagged pattern are arranged in parallel to each other and are disposed in an alternating fashion with respect to each other, and the first fine slit overlap the second fine slit, wherein the horizontal overlapping distance is between 0 μm to 20 μm, and the length of each of the first fine slits and the second fine slits is less than or equal to 40 μm.

17. The liquid crystal display device of claim 16, wherein the horizontal overlapping distance is half the length of the first fine slits and the second fine slits.

18. The liquid crystal display device of claim 16, wherein the first main slit and the second fine slits do not overlap each other in the horizontal direction, and the second main slit and the first fine slits do not overlap each other in the horizontal direction.

19. The liquid crystal display device of claim 16 further comprising at least one opening located on the common electrode and a storage capacitor disposed on the second substrate, wherein the storage capacitor partially overlaps the opening.

* * * * *